(12) United States Patent
Ozawa et al.

(10) Patent No.: US 11,352,274 B2
(45) Date of Patent: Jun. 7, 2022

(54) GAS DISSOLUTION SUPPLY APPARATUS AND GAS DISSOLUTION SUPPLY METHOD

(71) Applicant: EBARA CORPORATION, Tokyo (JP)

(72) Inventors: Suguru Ozawa, Tokyo (JP); Yuji Araki, Tokyo (JP); Toshifumi Watanabe, Tokyo (JP); Yoichi Nakagawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 16/885,794

(22) Filed: May 28, 2020

(65) Prior Publication Data

US 2020/0385295 A1 Dec. 10, 2020

(30) Foreign Application Priority Data

Jun. 4, 2019 (JP) .............................. JP2019-104150

(51) Int. Cl.
  *C02F 1/78* (2006.01)
  *C02F 1/00* (2006.01)
  *C02F 103/04* (2006.01)

(52) U.S. Cl.
  CPC ................ *C02F 1/78* (2013.01); *C02F 1/008* (2013.01); *C02F 2103/04* (2013.01); *C02F 2209/02* (2013.01); *C02F 2209/03* (2013.01); *C02F 2209/40* (2013.01)

(58) Field of Classification Search
  None
  See application file for complete search history.

(56) References Cited

U.S. PATENT DOCUMENTS

| 5,431,861 A | * | 7/1995 | Nagahiro | ................ B01F 5/106 261/140.1 |
| 2003/0000966 A1 | * | 1/2003 | Shelton | ................ B67D 3/0035 222/146.1 |
| 2003/0164338 A1 | | 9/2003 | Fittkau et al. | |
| 2011/0180148 A1 | | 7/2011 | Xia et al. | |
| 2016/0361693 A1 | | 12/2016 | Hayashi et al. | |
| 2018/0178173 A1 | * | 6/2018 | Nakao | .................. B01F 5/0657 |

FOREIGN PATENT DOCUMENTS

| EP | 3 403 717 A1 | 11/2018 |
| JP | H11-244873 A | 9/1999 |
| JP | 2014-117628 A | 6/2014 |
| WO | 02-085790 A2 | 10/2002 |

OTHER PUBLICATIONS

Extended European Search Report issued in European Patent Application No. 20177920.4 dated Oct. 9, 2020.

* cited by examiner

*Primary Examiner* — Richard C Gurtowski
(74) *Attorney, Agent, or Firm* — Pearne & Gordon LLP

(57) ABSTRACT

A gas dissolution supply apparatus dissolves a gas supplied from a gas supply unit in a liquid supplied from a liquid supply unit to produce a gas dissolution in a gas dissolving unit, stores the gas dissolution produced in the gas dissolving unit in a gas dissolution tank, supplies the gas dissolution from the gas dissolution tank to a point of use, measures the flow rate of a part of the gas dissolution supplied to the point of use that is returned to the gas dissolving unit, and adjusts the flow rate of the liquid supplied from the liquid supply unit to the gas dissolving unit based on the result of the measurement.

6 Claims, 3 Drawing Sheets

GAS DISSOLUTION SUPPLY APPARATUS AND GAS DISSOLUTION SUPPLY METHOD

CROSS-REFERENCE TO RELATED APPLICATIONS

This application claims the benefit of Japanese Priority Patent Application JP 2019-104150 filed on Jun. 4, 2019, the entire contents of which are incorporated herein by reference.

FIELD

The present invention relates to a gas dissolution supply apparatus and a gas dissolution supply method. In particular, it relates to a technique for saving a raw material liquid of a gas dissolution and keeping the concentration of the produced gas dissolution constant.

BACKGROUND AND SUMMARY

In recent years, the washing of products in semiconductor device plants or liquid crystal or other electronics manufacturing plants is becoming more complicated as manufacturing processes are becoming more complicated and circuit patterns are becoming finer. For example, a special liquid that is referred to as "functional water" produced by dissolving a high-purity gas or a high-purity gas and a chemical in ultrapure water (the special liquid will be referred to as a "cleaning liquid" hereinafter) is used to remove fine particles, metals, organic materials or the like from silicon wafers.

As for the washing method, the single-wafer processing method, which is to perform washing with a chemical and washing with ultrapure water for each wafer and thus can be used for low volume production of various types of wafers, is becoming more widely used than the batch processing method, which is to immerse and wash a plurality of silicon wafers at the same time and repeat the immersion and washing. The single-wafer processing method requires a longer washing time for each wafer (the time will be referred to as a "tact time" hereinafter) and a larger amount of cleaning liquid than the batch processing method, so that it is required to reduce the tact time and the amount of the cleaning liquid used. At present, in order to effectively wash wafers in a short time and reduce the amount of the cleaning liquid used, an advanced washing process is used which is performed by switching short-time washings using a plurality of types of functional water and a plurality of chemicals singly or in combination.

As the functional water, an ozone dissolution produced by dissolving ozone gas in ultrapure water is used. The ozone dissolution is typically produced by an ozone dissolution production apparatus. As the washing process advances and becomes complicated, it becomes necessary to turn on and off the supply of the ozone dissolution to the washing apparatus at short time intervals. However, once the ozone dissolution production apparatus stops producing the ozone dissolution, it takes a certain time (referred to as a "rise time" hereinafter) for the ozone dissolution production apparatus to become able to supply an ozone dissolution having a required ozone concentration at a required flow rate again. For this reason, the ozone dissolution production apparatus constantly produces the ozone dissolution and continuously supplies the ozone dissolution to the washing apparatus, in order to meet the demand for the ozone dissolution from the washing apparatus. Therefore, excessive ozone dissolution is supplied to the washing apparatus, and the ozone dissolution that is not used for washing of silicon wafers is discharged as drainage from the washing apparatus. Since a vast amount of ultrapure water is used as raw material water for producing the ozone dissolution, an ozone dissolution production apparatus has been proposed which uses a reduced amount of ultrapure water and maintains the concentration of the ozone dissolution in the circulation channel in the ozone dissolution supply device at a preset concentration.

With the conventional ozone dissolution supply apparatus, the ozone dissolution that is not used at the point of use is returned to a circulation tank through ozone dissolution return pipe. However, ozone decomposes by itself, and therefore, a problem can arise that the ozone concentration decreases during circulation. Therefore, there is a demand for development of a technique for reducing the amount of ultrapure water used and stabilizing the ozone concentration of the ozone dissolution in the ozone dissolution supply apparatus.

The present invention has been devised in view of the problem described above, and an object of the present invention is to provide a gas dissolution supply apparatus capable of saving a raw material liquid of a gas dissolution and stabilizing the concentration of the produced gas dissolution.

A gas dissolution supply apparatus according to an embodiment includes: a gas supply unit that supplies a gas that is a raw material of a gas dissolution; a liquid supply unit that supplies a liquid that is a raw material of the gas dissolution; a gas dissolving unit that dissolves the gas supplied from the gas supply unit in the liquid supplied from the liquid supply unit to produce the gas dissolution; a gas dissolution tank that stores the gas dissolution produced in the gas dissolving unit; supply pipe for supplying the gas dissolution from the gas dissolution tank to a point of use; return pipe for returning the gas dissolution to be supplied to the point of use to the gas dissolving unit; a flow rate measurement unit that measures a flow rate of the gas dissolution returned to the gas dissolving unit, the flow rate measurement unit being provided on the return pipe; a pressure adjustment unit that keeps a pressure in the supply pipe constant, the pressure adjustment unit being provided on the return pipe; and a flow rate adjustment unit that adjusts a flow rate of the liquid supplied from the liquid supply unit to the gas dissolving unit based on a result of the measurement by the flow rate measurement unit.

A gas dissolution supply method according to another aspect includes: dissolving, in a gas dissolving unit, a gas in a liquid to produce a gas dissolution, the gas being supplied from a gas supply unit and the liquid being supplied from a liquid supply unit; storing the gas dissolution produced in the gas dissolving unit in a gas dissolution tank; supplying the gas dissolution from the gas dissolution tank to a point of use; measuring a flow rate of a part of the gas dissolution supplied to the point of use that is returned to the gas dissolving unit; keeping a pressure in supply pipe for supplying the gas dissolution to the point of use constant; and adjusting a flow rate of the liquid supplied from the liquid supply unit to the gas dissolving unit based on a result of the measurement.

DETAILED DESCRIPTION OF NON-LIMITING EXAMPLE EMBODIMENTS

Figure 1:
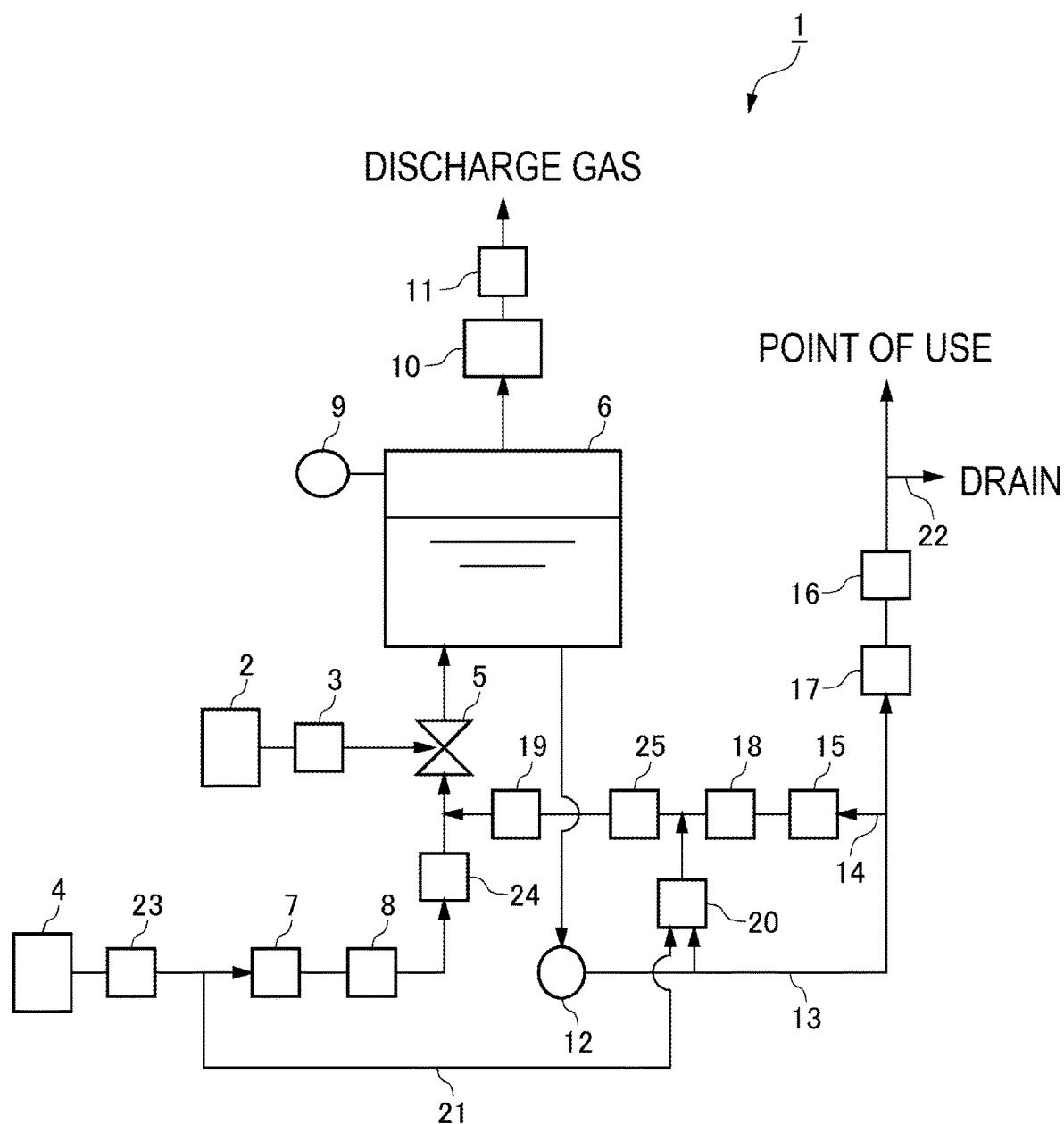
FIG. 1 is a diagram for illustrating a configuration of a gas dissolution supply apparatus according to an embodiment of the present invention.

In the following, a gas dissolution supply apparatus according to an embodiment will be described. Note that the embodiment described below is just an example of embodiments of the present technique, and the present technique is not limited to the specific configuration described below. When implementing the present technique, any specific configuration suitable for the implementation can be adopted.

A gas dissolution supply apparatus according to an embodiment includes: a gas supply unit that supplies a gas that is a raw material of a gas dissolution; a liquid supply unit that supplies a liquid that is a raw material of the gas dissolution; a gas dissolving unit that dissolves the gas supplied from the gas supply unit in the liquid supplied from the liquid supply unit to produce the gas dissolution; a gas dissolution tank that stores the gas dissolution produced in the gas dissolving unit; supply pipe for supplying the gas dissolution from the gas dissolution tank to a point of use; return pipe for returning the gas dissolution to be supplied to the point of use to the gas dissolving unit; a flow rate measurement unit that measures a flow rate of the gas dissolution returned to the gas dissolving unit, the flow rate measurement unit being provided on the return pipe; a pressure adjustment unit that keeps a pressure in the supply pipe constant, the pressure adjustment unit being provided on the return pipe; and a flow rate adjustment unit that adjusts a flow rate of the liquid supplied from the liquid supply unit to the gas dissolving unit based on a result of the measurement by the flow rate measurement unit.

With this configuration, the gas dissolving unit dissolves gas (the gas supplied from the gas supply unit) in liquid (the liquid supplied from the liquid supply unit) to produce a gas dissolution, and the gas dissolution is stored in the gas dissolution tank. Of the gas dissolution supplied to the point of use from the gas dissolution tank, the flow rate of the gas dissolution returned to the gas dissolving unit through the return pipe is measured, and the pressure in the supply pipe up to the point of use can be kept constant by the pressure adjustment unit installed on the return pipe. Furthermore, based on the measurement result, the flow rate of the liquid supplied from the liquid supply unit to the gas dissolving unit is adjusted. In this way, the liquid supplied to the gas dissolving unit can be saved.

In addition, if the flow rate of the liquid supplied to the gas dissolving unit (the total flow rate of the flow rate of the liquid supplied from the liquid supply unit and the flow rate of the gas dissolution returned to the gas dissolving unit through the return pipe) is kept constant, the flow rate of the gas supplied to the gas dissolving unit can be kept constant, so that the time over which the gas and the liquid are in contact with each other and therefore the efficiency of the disdissolution of the gas can be kept constant. Therefore, the concentration of the gas dissolution produced can be kept constant simply by controlling the concentration of the produced ozone gas according to the flow rate of the liquid supplied from the liquid supply unit.

In the gas dissolution supply apparatus according to the embodiment, the supply pipe may be provided with a pump for feeding the gas dissolution from the gas dissolution tank to the point of use, and the pump may be an air-driven pump.

With this configuration, since the air-driven pump is used as the pump for feeding the gas dissolution from the gas dissolution tank to the point of use, the temperature of the pump can be inhibited from increasing, and therefore, the temperature of the gas dissolution can be inhibited from increasing. Therefore, the temperature of the gas dissolution returned to the gas dissolving unit through the return pipe can be inhibited from increasing, so that the degree of disdissolution of the gas in the gas dissolving unit can be inhibited from decreasing (the gas can be inhibited from becoming less soluble as the temperature rises). The air-driven pump may be a bellows pump or a diaphragm pump, for example.

In the gas dissolution supply apparatus according to the embodiment, the supply pipe may be provided with a second flow rate measurement unit that measures a flow rate of the gas dissolution supplied to the point of use, and the flow rate adjustment unit may adjust the flow rate of the liquid supplied from the liquid supply unit to the gas dissolving unit based on the result of the measurement by the flow rate measurement unit and a result of the measurement by the second flow rate measurement unit.

With this configuration, not only the flow rate of the gas dissolution returned to the gas dissolving unit through the return pipe but also the flow rate of the gas dissolution supplied from the gas dissolution tank to the point of use is measured, and the flow rate of the liquid supplied from the liquid supply unit to the gas dissolving unit is adjusted based on the measurement results. In this way, the liquid supplied to the gas dissolving unit can be saved.

In the gas dissolution supply apparatus according to the embodiment, the return pipe may be provided with a temperature measurement unit that measures a temperature of the gas dissolution returned to the gas dissolving unit.

With this configuration, since the temperature of the gas dissolution returned to the gas dissolving unit through the return pipe can be measured, the temperature of the gas dissolution returned to the gas dissolving unit through the return pipe can be grasped and easily controlled. Therefore, the temperature of the gas dissolution returned to the gas dissolving unit through the return pipe can be inhibited from increasing, and the degree of disdissolution of the gas in the gas dissolving unit can be inhibited from decreasing (the gas can be inhibited from becoming less soluble as the temperature rises).

In the gas dissolution supply apparatus according to the embodiment, the gas that is a raw material of the gas dissolution may be ozone gas, the liquid that is a raw material of the gas dissolution may be pure water, and the gas dissolution may be an ozone dissolution.

With this configuration, the pure water supplied to the gas dissolving unit can be saved. In addition, the concentration (ozone concentration) of the ozone dissolution produced can be kept constant.

A gas dissolution supply method according to an embodiment includes: a gas dissolving unit dissolving a gas supplied from a gas supply unit in a liquid supplied from a liquid supply unit to produce a gas dissolution; storing the gas dissolution produced in the gas dissolving unit in a gas dissolution tank; supplying the gas dissolution from the gas dissolution tank to a point of use; measuring a flow rate of a part of the gas dissolution supplied to the point of use that is returned to the gas dissolving unit; adjusting a flow rate of the liquid supplied from the liquid supply unit to the gas dissolving unit based on a result of the measurement.

With this method, as with the apparatus described above, the liquid supplied to the gas dissolving unit can be saved. In addition, the concentration of the gas dissolution produced can be kept constant.

A configuration of an ozone dissolution supply apparatus according to this embodiment will be described with reference to the drawings. FIG. 1 is a diagram for illustrating the ozone dissolution supply apparatus according to this embodiment. As shown in FIG. 1, an ozone dissolution supply apparatus 1 includes a raw material gas supply unit 2 that supplies a row material gas of ozone gas, a discharge unit 3 that produces ozone gas, which is a raw material of an ozone dissolution, from the raw material gas, a pure water supply unit 4 that supplies pure water, which is a raw material of the ozone dissolution, a gas dissolving unit 5 that dissolves the gas supplied from the raw material gas supply unit 2 in the pure water supplied from the pure water supply unit 4 to produce the ozone dissolution, and a gas/liquid separation tank 6 that stores the ozone dissolution produced by the gas dissolving unit 5.

The discharge unit 3 has a capability of discharging to produce ozone gas from a raw material gas. The raw material gas is a gas mainly containing oxygen gas. For example, a gas mixture of oxygen gas and nitrogen gas, a gas mixture of oxygen gas and carbonic acid gas, a gas mixture of oxygen gas, nitrogen gas and carbonic acid gas, oxygen gas, or air is used, for example. The raw material gas supply unit 2 has a capability of adjusting the flow rate of the raw material gas supplied from the raw material gas supply unit 2 to the discharge unit 3 to adjust the flow rate of the ozone gas supplied to the gas dissolving unit 5.

The pure water supply unit 4 is provided with a pure water flowmeter 7 that measures the flow rate of the pure water supplied from the pure water supply unit 4 to the gas dissolving unit 5 and a pure water flow rate adjustment unit 8 that adjusts the flow rate of the pure water supplied from the pure water supply unit 4 to the gas dissolving unit 5.

The gas dissolving unit 5 may be an ejector or aspirator, for example. The ejector or aspirator can dissolve ozone gas in pure water by using the Venturi effect. In comparison with an ozone dissolving tank using a hollow fiber membrane, the ejector or aspirator does not require regular replacements and achieves a higher rate of disdissolution.

The gas/liquid separation tank 6 is a tank for separating the ozone gas remaining undissolved in the gas dissolving unit 5 from the ozone dissolution. A part of the gas/liquid separation tank 6 that is to come into contact with the ozone dissolution or ozone gas is made of a material (such as a fluoropolymer) that is resistant to the ozone dissolution or ozone gas. The gas/liquid separation tank 6 is provided with a water gauge 9 that measures the level of the ozone dissolution stored in the gas/liquid separation tank 6, and an ozone gas decomposing device 10 that decomposes the ozone gas stored in the gas/liquid separation tank 6 (the ozone gas remaining undissolved) into oxygen gas. The ozone dissolution supply apparatus 1 further includes a first pressure adjustment unit 11 that keeps the pressure in the gas/liquid separation tank 6 constant.

The ozone dissolution supply apparatus 1 further includes a pump 12 for feeding the ozone dissolution stored in the gas/liquid separation tank 6 to a point of use (such as a semiconductor manufacturing apparatus), supply pipe 13 for supplying the ozone dissolution from the gas/liquid separation tank 6 to the point of use, and return pipe 14 for circulating the ozone dissolution to be supplied to the point of use to return the ozone dissolution to the gas dissolving unit 5.

The pump 12 is an air-driven pump, for example. A part of the pump 12 that is to come into contact with the ozone dissolution or ozone gas is made of a material (such as a fluoropolymer) that is resistant to the ozone dissolution or ozone gas. The air-driven pump may be a bellows pump or a diaphragm pump, for example.

The return pipe 14 is provided with a first flowmeter 15 that measures the flow rate of the ozone dissolution returned to the gas dissolving unit 5. The supply pipe 13 is provided with a second flowmeter 16 that measures the flow rate of the ozone dissolution supplied to the point of use. The supply pipe 13 is further provided with a pressure sensor 17 that measures the pressure of the ozone dissolution supplied to the point of use, and the return pipe 14 is provided with a second pressure adjustment unit 18 that keeps the pressure in the supply pipe 13 and the return pipe 14 constant.

Figure 2:
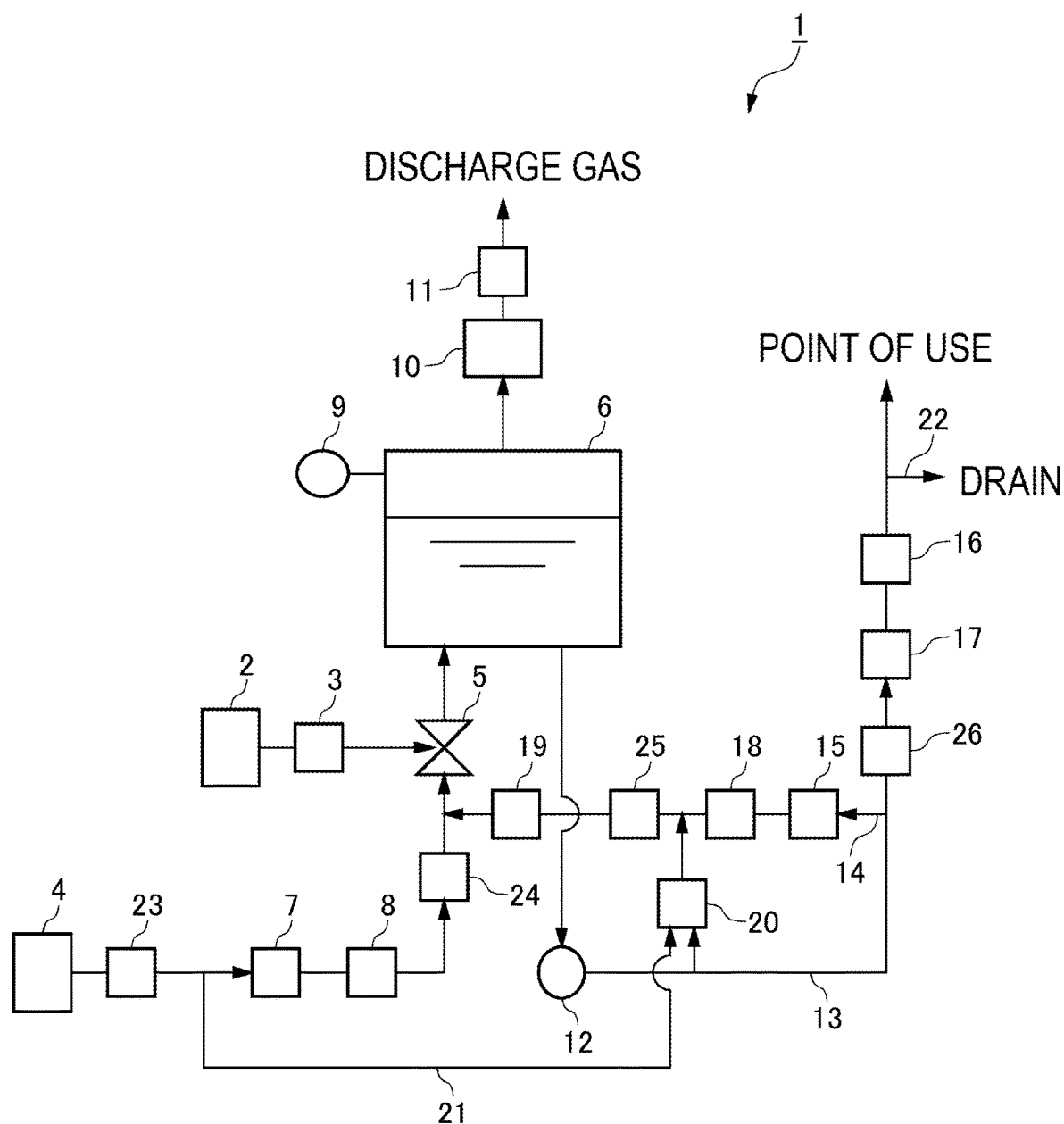
FIG. 2 is a diagram for illustrating another example of the configuration of the gas dissolution supply apparatus according to the embodiment of the present invention.

The second pressure adjustment unit 18 has a capability of adjusting and controlling the opening to keep the pressure of the ozone dissolution measured by the pressure sensor 17 constant. Alternatively, as shown in FIG. 2, the supply pipe 13 may be provided with a third pressure adjustment unit 26 to adjust the pressure.

The pure water flow rate adjustment unit 8 adjusts the flow rate of the pure water supplied from the pure water supply unit 4 to the gas dissolving unit 5 based on the measurement results from the first flowmeter 15 and the second flowmeter 16. Note that the second flowmeter 16 is not essential. If the second flowmeter 16 is not provided, the pure water flow rate adjustment unit 8 adjusts the flow rate of the pure water supplied from the pure water supply unit 4 to the gas dissolving unit 5 based on the result of the measurement of the ozone dissolution that is not used at the point of use from the first flowmeter 15.

The raw material gas supply unit 2 adjusts the flow rate of the ozone gas supplied from the discharge unit 3 to the gas dissolving unit 5 by adjusting the flow rate of the raw material ozone gas based on the flow rate of the liquid supplied to the gas dissolving unit 5 (the total flow rate of the flow rate of the pure water supplied from the pure water supply unit 4 to the gas dissolving unit 5 and the flow rate of the ozone dissolution supplied to the gas dissolving unit 5 through the return pipe 14).

The return pipe 14 is provided with a thermometer 19 that measures the temperature of the ozone dissolution returned to the gas dissolving unit 5. Note that the thermometer 19 is not essential. The return pipe 14 is further provided with a concentration meter 20 that measures the concentration of the ozone dissolution supplied to the gas dissolving unit 5 and zero-point measurement pipe 21 for measuring the zero point of the concentration meter 20.

The supply pipe 13 is provided with discharge pipe 22 branching off from the supply pipe 13 for discharging, through a drain, some of the ozone dissolution to be supplied to the point of use. The pipe connecting the pure water supply unit 4 and the gas dissolving unit 5 to each other is provided with a first valve 23 at a location downstream of the pure water supply unit 4 and a second valve 24 at a location upstream of the gas dissolving unit 5. The return pipe 14 is further provided with a third valve 25 at a location downstream of the second pressure adjustment unit 18.

With the gas dissolution supply apparatus according to this embodiment, the gas dissolving unit 5 dissolves ozone gas in pure water to produce an ozone dissolution, and the gas/liquid separation tank 6 stores the ozone dissolution. Of the ozone dissolution supplied from the gas/liquid separation tank 6 to the point of use, the flow rate of the ozone dissolution returned to the gas dissolving unit 5 through the return pipe 14 is measured, and the flow rate of the pure water supplied from the liquid supply unit 4 to the gas dissolving unit 5 is adjusted based on the measurement result. In this way, the pure water supplied to the gas dissolving unit 5 can be saved.

According to this embodiment, not only the flow rate of the ozone dissolution returned to the gas dissolving unit 5 through the return pipe 14 but also the flow rate of the ozone dissolution supplied from the gas/liquid separation tank 6 to the point of use is measured, and the flow rate of the pure water supplied from the liquid supply unit 4 to the gas dissolving unit 5 is adjusted based on the measurement results. In this way, the pure water supplied to the gas dissolving unit 5 can be saved.

For example, if the amount of the ozone dissolution used at the point of use is zero, the flow rate measured by the first flowmeter 15 is at the maximum, and the flow rate measured by the second flowmeter 16 is zero. If such measurements are obtained, the second valve 24 can be closed to save the pure water supplied to the gas dissolving unit 5.

If the amount of the ozone dissolution used at the point of use has changed, the second valve 24 is opened according to the measurement results from the first flowmeter 15 and the second flowmeter 16, and the pure water flow rate adjustment unit 8 adjusts the flow rate of the pure water supplied to the gas dissolving unit 5. In this way, the pure water supplied to the gas dissolving unit 5 can be saved.

In the latter case, if the flow rate of the liquid supplied to the gas dissolving unit 5 (the total flow rate of the flow rate of the pure water supplied from the liquid supply unit 4 and the flow rate of the ozone dissolution returned to the gas dissolving unit 5 through the return pipe 14) is kept constant, the flow rate of the ozone gas supplied to the gas dissolving unit 5 can be kept constant, so that the time over which the gas and the liquid are in contact with each other and therefore the efficiency of the disdissolution of the ozone gas can be kept constant. In other words, the concentration of the ozone dissolution produced can be easily kept constant.

Furthermore, in this embodiment, since an air-driven pump is used as the pump 12 for feeding the ozone dissolution from the gas/liquid separation tank 6 to the point of use, the temperature of the pump 12 can be inhibited from increasing, and therefore, the temperature of the ozone dissolution can be inhibited from increasing. Therefore, the temperature of the ozone dissolution returned to the gas dissolving unit 5 through the return pipe 14 can be inhibited from increasing, so that the degree of dissolution of the ozone gas in the gas dissolving unit 5 can be inhibited from decreasing (the ozone gas can be inhibited from becoming less soluble as the temperature rises).

Furthermore, in this embodiment, since the temperature of the ozone dissolution returned to the gas dissolving unit 5 through the return pipe 14 can be measured, the temperature of the ozone dissolution returned to the gas dissolving unit 5 through the return pipe 14 can be grasped and easily controlled. Therefore, the temperature of the ozone dissolution returned to the gas dissolving unit 5 through the return pipe 14 can be inhibited from increasing, and the degree of dissolution of the ozone gas in the gas dissolving unit 5 can be inhibited from decreasing (the ozone gas can be inhibited from becoming less soluble as the temperature rises).

Furthermore, in this embodiment, since the first pressure adjustment unit 11 is provided which can adjust the pressure in the gas/liquid separation tank 6 within a range of 0 to 100 KPa, the pressure in the gas/liquid separation tank 6 can be increased to increase the degree of dissolution and thus reduce the amount of the supplied ozone gas. However, if the pressure in the gas/liquid separation tank 6 is too high, the pressure inhibits the operation of the air-driven pump 12, and the unused ozone dissolution cannot be returned from the point of use. For this reason, the range of the pressure in the gas/liquid separation tank 6 from 0 to 100 KPa is preferred.

Although an embodiment of the present invention has been described for the purpose of illustration, the scope of the present invention is not limited to the embodiment, and various modifications and variations are possible as required without departing from the scope set forth in the claims.

For example, although the circulating ozone dissolution supply apparatus 1 that dissolves ozone gas in pure water to produce an ozone dissolution has been described for the purpose of illustration, the scope of the present invention is not limited to the ozone dissolution supply apparatus. Specifically, the raw material gas is not limited to ozone gas, and the raw material liquid is not limited to pure water. For example, carbon dioxide may be dissolved in pure water to produce a carbonated water, or nitrogen may be dissolved in pure water to produce nitrogen water. Furthermore, hydrogen may be dissolved in pure water to produce hydrogen water. The present invention can be widely applied to the dissolution of gas for producing functional water.

Figure 3:
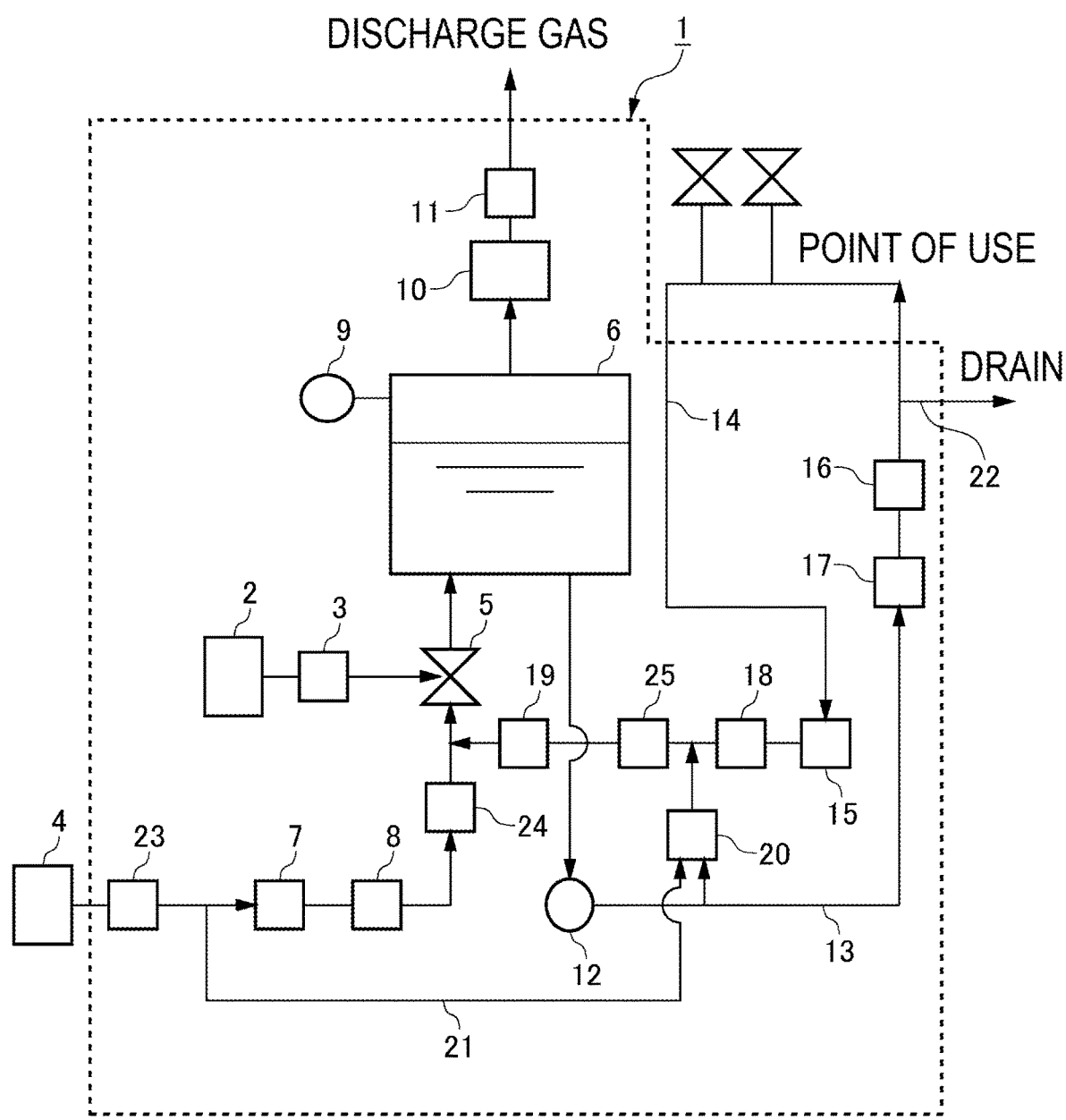
FIG. 3 is a diagram for illustrating another example of the configuration of the gas dissolution supply apparatus according to the embodiment of the present invention.

Furthermore, although an example in which the return pipe 14 has been described as branching off from the supply pipe 13 at a point preceding the point of use (upstream of the point of use), the return pipe 14 may be provided following the point of use (downstream of the point of use) as shown in FIG. 3.

As described above, the gas dissolution supply apparatus according to the present invention can advantageously save the raw material liquid of the gas dissolution and stabilize the concentration of the produced gas dissolution, and is useful as an ozone dissolution supply apparatus that dissolves ozone gas in pure water to produce an ozone dissolution, for example.

1 ozone dissolution supply apparatus
2 raw material gas supply unit
3 discharge unit (gas supply unit)
4 pure water supply unit (liquid supply unit)
5 gas dissolving unit
6 gas/liquid separation tank (gas dissolution tank)
7 pure water flowmeter
8 pure water flow rate adjustment unit
9 water gauge
10 ozone gas decomposing device
11 first pressure adjustment unit
12 pump
13 supply pipe
14 return pipe
15 first flowmeter (flow rate measurement unit)
16 second flowmeter (second flow rate measurement unit)
17 pressure sensor
18 second pressure adjustment unit
19 thermometer (temperature measurement unit)
20 concentration meter
21 zero-point measurement pipe
22 discharge pipe
23 first valve
24 second valve
25 third valve
26 third pressure adjustment unit

What is claimed is:

1. A gas dissolution supply apparatus, comprising:
a gas supply unit that supplies a gas that is a raw material of a gas dissolution;
a liquid supply unit that supplies a liquid that is a raw material of the gas dissolution;
a gas dissolving unit that dissolves the gas supplied from the gas supply unit in the liquid supplied from the liquid supply unit to produce the gas dissolution;
a gas dissolution tank that stores the gas dissolution produced in the gas dissolving unit;
supply pipe for supplying the gas dissolution from the gas dissolution tank to a point of use, the gas dissolution being supplied from the gas dissolution tank to the point of use through the supply pipe;
return pipe for returning the gas dissolution to be supplied to the point of use to the gas dissolving unit, the return pipe being separated from the supply pipe upstream of the point of use and being connected to the gas dissolving unit;
a first flow rate measurement unit that measures a flow rate of the gas dissolution returned to the gas dissolving unit, the first flow rate measurement unit being provided on the return pipe;
a second flow rate measurement unit that measures a flow rate of the gas dissolution supplied to the point of use, the second flow rate measurement unit being provided on the supply pipe;
a pressure adjustment unit that keeps a pressure in the supply pipe constant, the pressure adjustment unit being provided on the return pipe; and
a flow rate adjustment unit that adjusts a flow rate of the liquid supplied from the liquid supply unit to the gas dissolving unit based on a result of the measurement by the first flow rate measurement unit and a result of the measurement by the second flow rate measurement unit.

2. The gas dissolution supply apparatus according to claim 1, wherein the supply pipe is provided with a pump for feeding the gas dissolution from the gas dissolution tank to the point of use, and
the pump is an air-driven pump.

3. The gas dissolution supply apparatus according to claim 1, wherein the return pipe is provided with a temperature measurement unit that measures a temperature of the gas dissolution returned to the gas dissolving unit.

4. The gas dissolution supply apparatus according to claim 1, further comprising a second pressure adjustment unit capable of adjusting a pressure in the gas dissolution tank to be maintained within a range of 0 to 100 KPa.

5. The gas dissolution supply apparatus according to claim 1, wherein the gas that is a raw material of the gas dissolution is ozone gas,
the liquid that is a raw material of the gas dissolution is pure water, and
the gas dissolution is an ozone dissolution.

6. A gas dissolution supply method, comprising:
dissolving, in a gas dissolving unit, a gas in a liquid to produce a gas dissolution, the gas being supplied from a gas supply unit and the liquid being supplied from a liquid supply unit;
storing the gas dissolution produced in the gas dissolving unit in a gas dissolution tank;
supplying, through a supply pipe, the gas dissolution from the gas dissolution tank to a point of use;
returning, through a return pipe separated from the supply pipe upstream of the point of use and being connected to the gas dissolving unit, the gas dissolution to be supplied to the point of use through the supply pipe to the gas dissolving unit after the gas dissolution is supplied from the gas dissolution tank and before the gas dissolution is supplied to the point of use;
measuring, by a first flow rate measurement unit, a flow rate of a part of the gas dissolution supplied to the point of use that is returned to the gas dissolving unit through the return pipe;
measuring, by a second flow rate measurement unit, a flow rate of a part of the gas dissolution supplied to the point of use through the supply pipe;
keeping a pressure in the supply pipe for supplying the gas dissolution to the point of use constant; and
adjusting, by a flow rate adjustment unit, a flow rate of the liquid supplied from the liquid supply unit to the gas dissolving unit based on a result of the measurement by the first flow rate measurement unit and on a result of the measurement by the second flow rate measurement unit.

* * * * *